W. J. BAIRD.
MOLDING MACHINE.
APPLICATION FILED JULY 9, 1910.

1,137,946.

Patented May 4, 1915.
5 SHEETS—SHEET 1.

WITNESSES:
James P. Barry
W. K. Fad

INVENTOR:
William J. Baird.
BY
ATTORNEYS

W. J. BAIRD.
MOLDING MACHINE.
APPLICATION FILED JULY 9, 1910.

1,137,946.

Patented May 4, 1915.
5 SHEETS—SHEET 2.

WITNESSES:
James P. Barry.
W. K. Find.

INVENTOR:
William J. Baird.
BY
ATTORNEYS

W. J. BAIRD.
MOLDING MACHINE.
APPLICATION FILED JULY 9, 1910.
1,137,946.
Patented May 4, 1915.
5 SHEETS—SHEET 3.
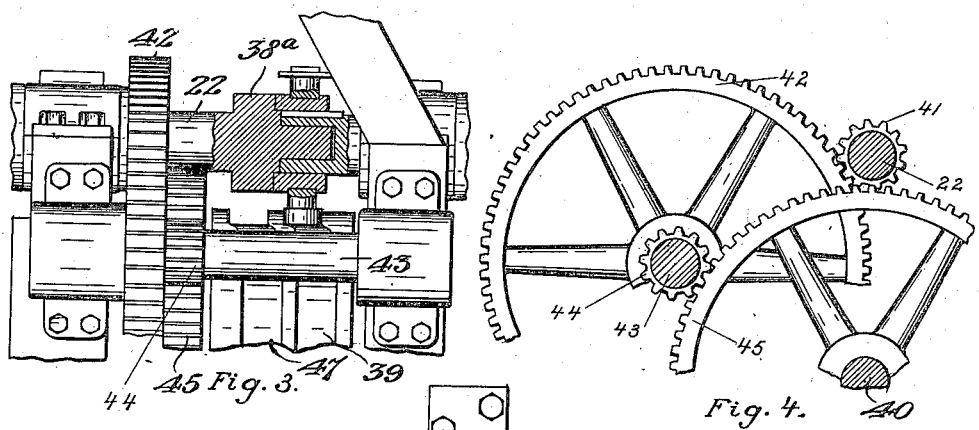
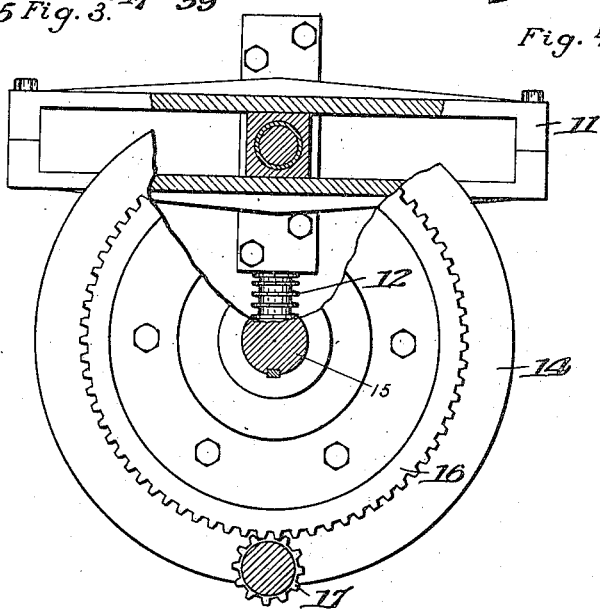
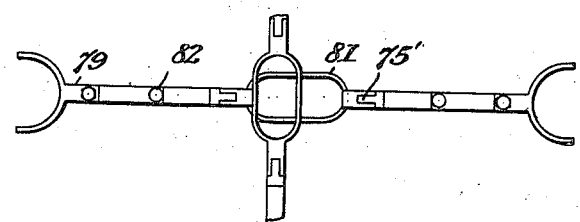
WITNESSES
James P. Barry.
INVENTOR
William J. Baird.
BY
ATTORNEYS

W. J. BAIRD.
MOLDING MACHINE.
APPLICATION FILED JULY 9, 1910.

1,137,946.

Patented May 4, 1915.
5 SHEETS—SHEET 5.

WITNESSES
James P. Barry
W. K. Frad

INVENTOR
William J. Baird
BY
ATTORNEYS

UNITED STATES PATENT OFFICE.

WILLIAM J. BAIRD, OF DETROIT, MICHIGAN.

MOLDING-MACHINE.

1,137,946.

Specification of Letters Patent.

Patented May 4, 1915.

Application filed July 9, 1910. Serial No. 571,198.

*To all whom it may concern:*

Be it known that I, WILLIAM J. BAIRD, a citizen of the United States of America, residing at Detroit, in the county of Wayne and State Michigan, have invented certain new and useful Improvements in Molding-Machines, of which the following is a specification, reference being had therein to the accompanying drawings.

The invention relates generally to a machine for forming articles from plastic material, and it consists in the construction thereof, in the arrangement and combination of parts, and in various details of construction, as will be more fully hereinafter set forth.

For the purpose of illustration, I have shown my invention as embodied in an automatic machine, especially designed for forming articles from clay, such for instance as flower pots.

Figures 1, 15, 19:
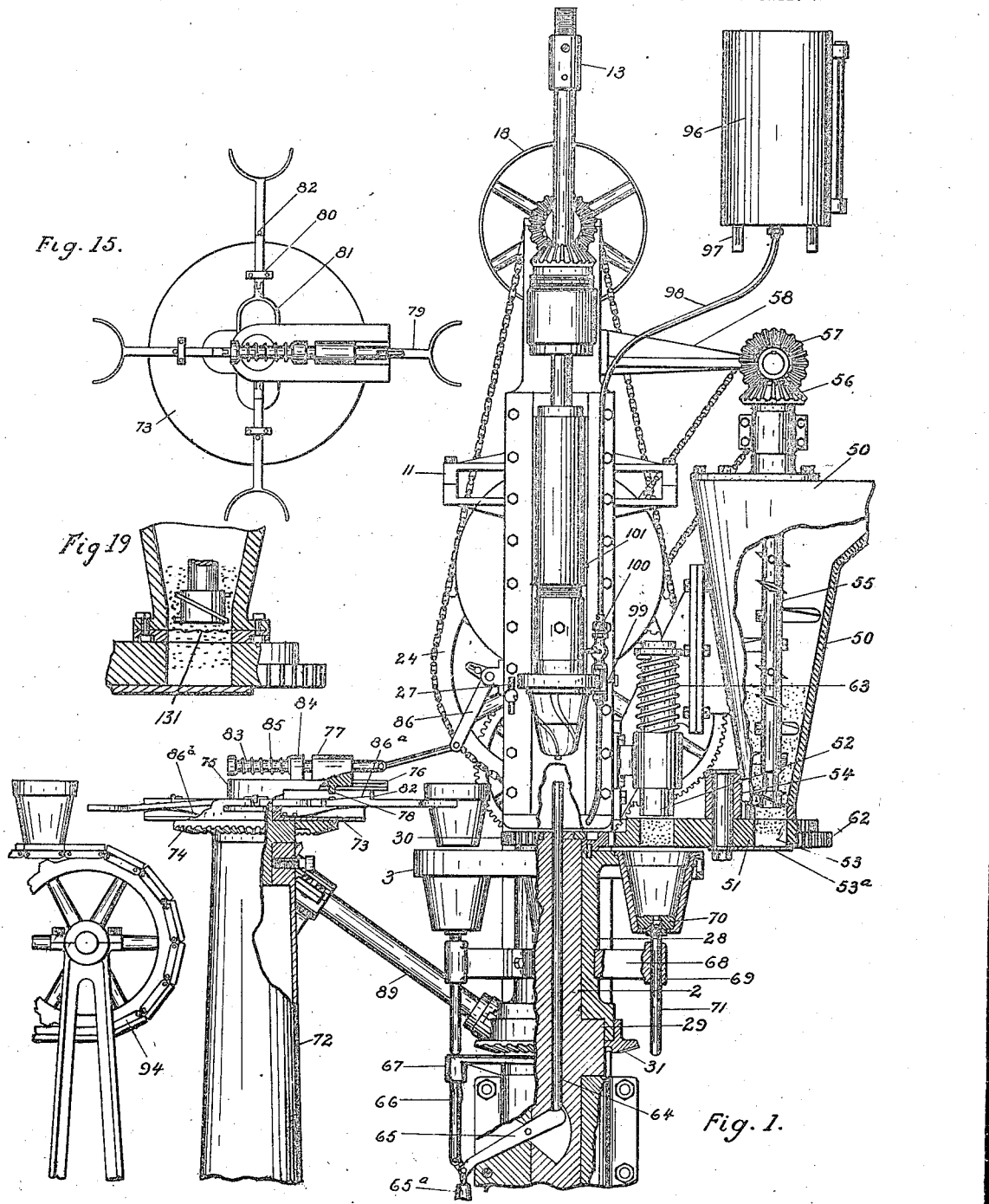
Figure 2:
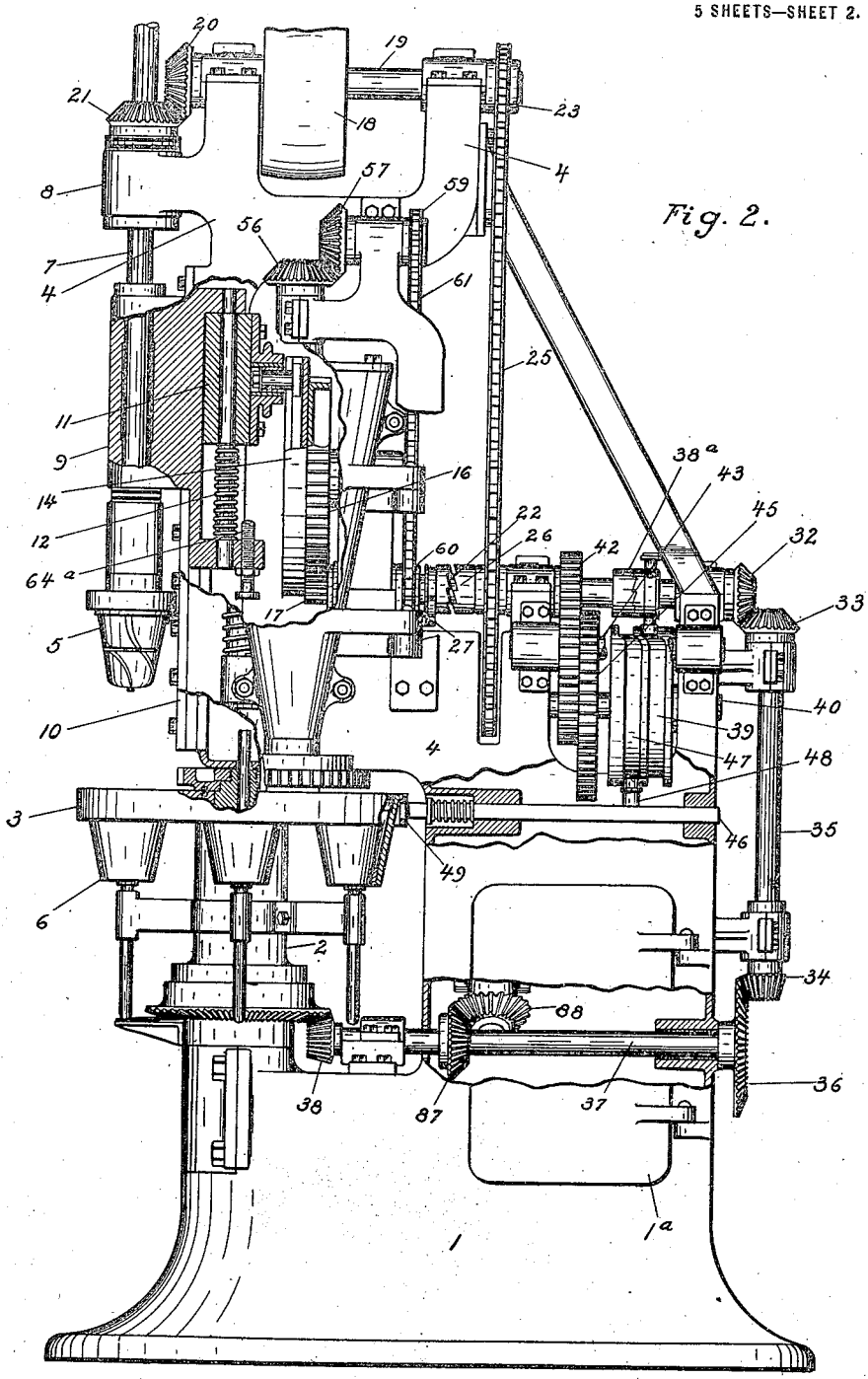
Figure 16:
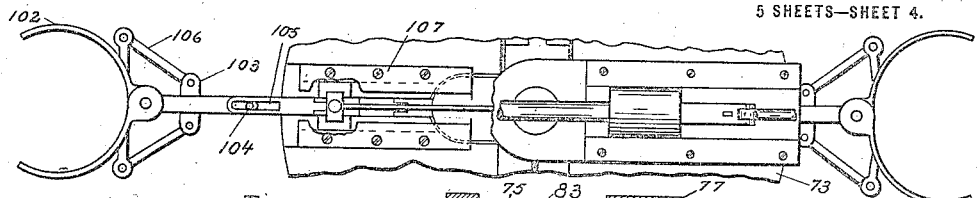
Figure 17:
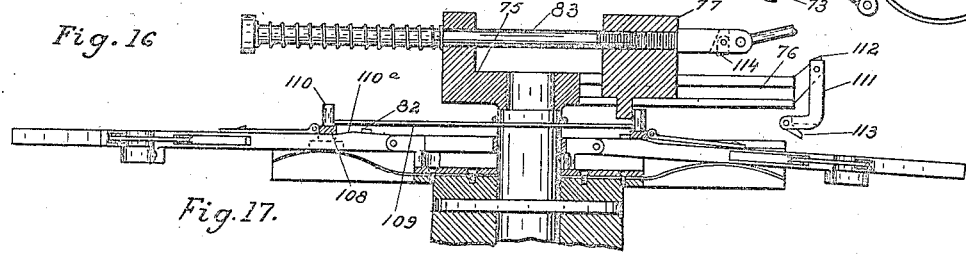
Figure 6:
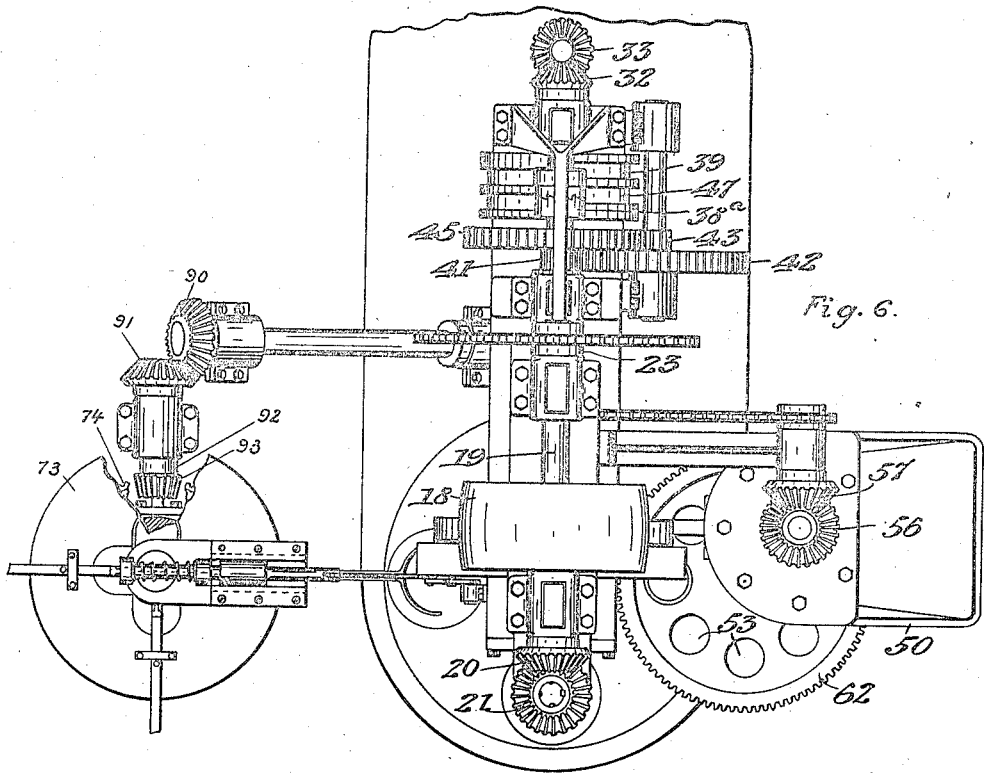
Figure 18:
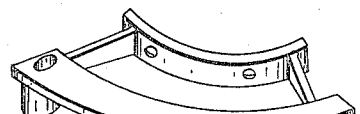
Figure 10:
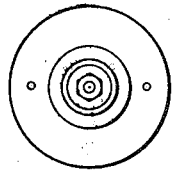
Figure 9:
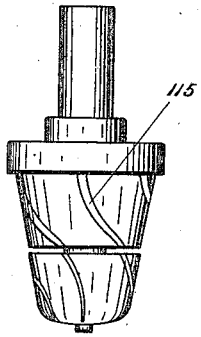
Figure 11:
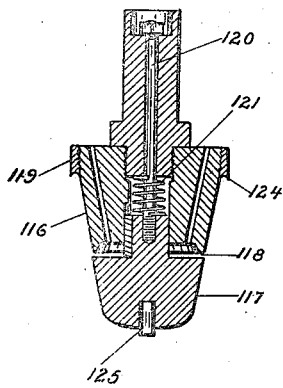
Figure 13:
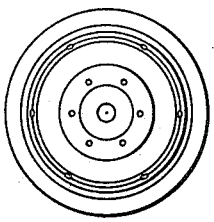
Figure 12:
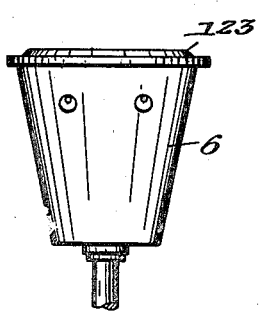
Figure 14:
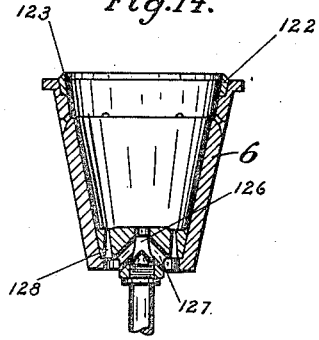

In the drawings illustrating the invention,—Figure 1 is a sectional front elevation of the machine, the lower base portion being omitted; Fig. 2 is a sectional side elevation; Fig. 3 is an enlarged sectional side elevation of a portion of the mechanism for imparting an intermittent travel to the mold carrier; Fig. 4 is a sectional end elevation of the same mechanism; Fig. 5 is an enlarged sectional elevation of the mechanism for actuating the former; Fig. 6 is a plan view; Fig. 7 is a detached plan view of the article-transferring means; Fig. 8 is a view in side elevation; Fig. 9 is a view in side elevation of the former; Fig. 10 is a plan view thereof; Fig. 11 is a vertical central section therethrough; Fig. 12 is a view in side elevation of the mold; Figs. 13 and 14 a plan view of the mold and a vertical central section therethrough; Fig. 15 a plan view of the transfer mechanism; Figs. 16 and 17 views in plan and in section of a modified form of transferring means; Fig. 18 is a detail perspective view of the releasing device; and Fig. 19 is an enlarged sectional view, illustrating means for purifying the material.

In construction, the machine comprises a base section 1, made preferably hollow to contain a number of the working parts of the mechanism, and provided with a door 1ª through which access may be conveniently had to the interior parts. Rising from the base section is a standard 2, upon which is mounted for rotation in a horizontal plane a table 3, forming the mold carrier of the mechanism.

4 is a supporting frame, rising vertically from the base section, as shown.

5 is the spinner or former, mounted upon the support for vertical reciprocation and rotation, and 6 are the molds arranged in a circular series on the periphery of the carrier 3 and adapted to register with the spinner.

In general, the machine includes a mechanism for reciprocating the former and rotating the same during the reciprocation; means for intermittently rotating the mold carrier to bring the molds successively into operative relation with the spinner or former; feed mechanism for automatically delivering material to the molds; and a delivery mechanism for delivering the finished articles; the several groups of mechanisms being timed to properly coöperate, as hereinafter more fully set forth.

Considering, first, the former-actuating means, the construction is as follows: 7 represents a spindle for the former journaled in a vertical bearing 8 on the supporting frame 4, and extending through and held against endwise movement within a sliding head 9. The head is mounted for vertical reciprocation in a guide 10, and is operated by a crosshead 11 having a limited vertical play within the head opposed by a cushion spring 12. An adjustable collar 13 on the former spindle determines the extent of relative movement of the crosshead.

Motion is imparted to the crosshead by a disk crank 14 journaled on a stub-shaft 15 (Fig. 5) actuated by a gear 16 carried by the crank and a driving pinion 17 meshing with the gear. This pinion the spindle 7 and former are rotated by a driving mechanism comprising a main drive pulley 18 upon a shaft 19 journaled in the top of the supporting frame 4; bevel gears 20 and 21, the latter being splined upon the spindle; a driven shaft 22 carrying the pinion 17; sprocket gears 23 and 24 upon the shafts 19 and 22 respectively fixed and loose thereon, and a sprocket chain 25 connecting the gears. A suitable clutch, as 26, is splined on the shaft 22 for engagement with the sprocket 24. A lever 27 projecting outwardly beyond the machine front controls the clutch and governs the operation of the machine.

The preferable construction of mechanism controlling the operation of the mold carrier includes a locking means for positively holding the carrier against movement during the rest intervals to permit not only of the proper coöperation of the former and mold, but the deposit within a complementary mold of a measured quantity of material to be worked, and the delivery from a third mold of a finished article.

The carrier, as shown in Fig. 1, is formed with a sleeve 28 encircling the standard 2, and seats upon a shoulder 29 thereon. At its upper end, the sleeve carries a gear 30, and at the lower end a bevel gear 31 to which rotary motion is transmitted from the shaft 22 through a gear train made up of bevel pinion 32 upon said shaft, similar pinions 33 and 34 upon a shaft 35, a bevel gear 36 on the horizontal shaft 37, and a pinion 38 meshing with the bevel gear upon the sleeve 28.

The intermittent movement of the carrier is effected through the agency of a clutch 38ª upon the shaft 22, and a cam 39 controlling the clutch arranged upon a stub shaft 40 driven by a gear train connecting with the shaft 22. This train, shown more clearly in Figs. 4 and 6, includes a pinion 41 upon the latter shaft, a gear 42 upon a stub shaft 43, a gear pinion 44 upon said stub shaft, and a gear 45 fixed upon the cam shaft 40 and meshing with the pinion 44. As shown in Fig. 3, shaft 22 is broken near its outer end, and the extremity carrying the pinion 32 is connected to and is disconnected from the main section through the clutch. The cam is driven continuously, and is so fashioned as to cause an intermittent operation of the clutch, and the desired step-by-step movement of the carrier, the molds being brought to rest successively under the rotating former.

To lock the carrier during the rest intervals, I employ a spring-pressed locking bar 46 journaled in bearings in the supporting frame immediately adjacent the carrier, and a cam 47 similar to and adjoining the cam 39, controlling through a stud 48 its operation. During each interval of rest, the bar is automatically projected within one of a series of recesses, as 49, formed within the carrier periphery, thus holding the carrier absolutely stationary, while the feeding and forming is being effected. Upon the expiration of the rest period, the bar is automatically withdrawn by its cam, leaving the carrier free to be again positively rotated.

*Feed mechanism.*—This mechanism comprises in the preferred form a hopper 50 for the material that is to be supplied to the molds, and transferring means, in the form of an apertured disk 51 adapted to carry the material directly to the molds, and a spring-pressed ejector 52 for forcing the material from the disk apertures within the molds. The disk has formed in its peripheral portion a series of apertures or openings, as 53, corresponding to twice the number of the molds, and is pivoted in a horizontal plane above and to one side of the carrier 3 to discharge within the central portions of the molds. A stationary plate 53ª beneath the disk and alining with the discharge end of the hopper permits the proper filling of the disk apertures with the material to be effected. The disk is supported on a bracket 54, and the bracket on the hopper, which in turn is rigidly attached to the supporting frame 4. The hopper is formed with a tapered discharge end to fit the opening in the disk, and extends in immediate proximity to the upper face of the disk, as shown.

55 is a feed screw within the hopper, having a drive connection with the shaft 22 through a bevel pinion 56 upon the upper end of the screw, a pinion 57 mounted on a bracket arm 58, sprocket gears 59 and 60 connected respectively to the gear 57 and the shaft 22, and a sprocket chain 61 connecting the gears.

The feeding disk described is rotated by means of a gear 62 thereon twice the diameter of, and meshing with the gear 30 upon the rotary sleeve 28.

The ejector is in the form of a plunger mounted for reciprocation above the mold series and the apertures in the feeding disk. The parts are so arranged and proportioned that upon the descent of the former or spinner its crosshead 11 engages the ejector, causing the latter to force the material from the alining aperture in the feeding disk into the mold therebeneath. Upon the return upward movement of the former, the ejector spring 63 restores the ejector to its initial position.

The delivery mechanism in the particular type of machine illustrated comprises mechanism for disengaging the finished article from the mold, and means for automatically transferring the article from the machine to preferably a suitable conveyer. In detail, the construction is as follows: Mounted centrally within the standard 2 is a rod 64, adapted to be engaged at its upper end by an adjustable stop 64ª carried by the reciprocating former. At its lower end, this rod engages the lever 65, which in turn is connected to an ejector rod 66 mounted for reciprocation within a stationary bearing 67.

68 is a spider clamped upon the sleeve 28, and 69 are vertical guides carried at the extremities of the spider arms. Each mold is provided with a vertically shiftable base plate 70, and fixed to and depending from this plate is a guide rod 71 that engages the guide in the spider arm therebelow.

Opposite the stationary bearing 67 is a standard 72 carrying at its upper end a centrally apertured table 73 mounted upon the standard for rotary movement.

74 is a bevel gear carried upon the under face of the table, and 75 is a stationary member projecting from the standard upwardly through the opening in the table.

76 is a guide rigidly secured to the stationary member described, and projecting in the direction of the stationary bearing 67, and 77 is a block sliding within the guide carrying upon its under face a projection or lug 78.

79 represents forked arms arranged upon the table in pairs (Fig. 15), the arms in each pair alining and the pairs extending in right angular relation. A guide 80 upon the table is provided for each arm, and the arms in each pair are united by a yoke member 81 that straddles the central member 75 and has a hinge connection 75′ with each arm, permitting a vertical rocking movement for a purpose hereinafter set forth. Each of the arms described carries near its forked end a vertical projection 82 adapted to be engaged by the depending lug 78 on the sliding block. The block in turn is connected to a rod 83 extending horizontally through a bearing 84 and provided with a spring 85 between said bearing and a suitable head on the rod end. The free end of the rod described is connected to a bellcrank lever 86, fulcrumed upon the upright frame of the machine in the path of the reciprocating crosshead 11. 86$^a$ is an incline on each arm, adapted to pass beneath the guide 80, and 86$^b$ is a spring arm support. The table 73 is driven by a gear train from the shaft 37.

87 is a bevel gear on said shaft, which meshes with a corresponding gear 88 upon the shaft 89 extending diagonally from the base section of the machine to and having a suitable bearing upon the standard 72. At the upper end of this shaft is a bevel pinion 90 (Fig. 6), which meshes with a pinion 91 on a stub shaft 92 carrying a pinion 93 on its inner end, which engages the bevel gear upon the lower face of the table 73. An endless carrier of any suitable type is preferably employed to receive the finished article.

When clay or similar plastic material is used for making vessels, such as flower pots, table cups, saucers, bowls, and the like, it is desirable to use a lubricant of some kind, such as a thin oil, during the operation of fashioning the article. I therefore preferably employ a suitable oil reservoir 96, mounted upon a suitable support 97 and provided with a delivery pipe 98 extending into operative relation to the mold that alines with the former. A valve 99 regulates the amount of discharge of oil through the pipe, while a valve 100 adapted to be operated automatically by a trip 101 upon the reciprocating former allows the oil to be discharged intermittently upon the material to be worked.

In operation, the main drive shaft 19 of the machine being rotated, motion is transmitted simultaneously to the feed and delivery mechanisms, and the former, the latter being continuously reciprocated and rotated during its reciprocation. As the former descends to operate within the registering mold, the finished article within the advanced mold is projected upwardly therefrom in a position for transfer to the carrier. The material is deposited within the mold next to aline with the former, and subsequently the transfer arm is moved inwardly into engagement with the raised article. During these movements the mold carrier is held stationary by its automatic lock, and the filling of the aperture in the feed disk alining with the hopper is effected. The downward pressure the former exerts upon the material to be worked is gradually increased through the agency of the spring 12 until the crosshead is at the limit of its descent. During this period the rotation of the former spreads the material until it conforms to the shape of the mold, a limited amount of lubricant having been admitted to facilitate the spreading of the material.

Upon the ascent of the former, after the fashioning of the article has been effected, the ejector 52 is immediately restored to its initial position, and simultaneously therewith the rod 83 is retracted by its spring 85, and the mold plate descends to its operative position within the mold by means of a weight 65$^a$. As the gear trains operate, the mold carrier is unlocked, and it and the feeding disk partially rotated, bringing another mold with material therein into alinement with the former, and an empty mold beneath the filled aperture of the feed disk. At the same time, the table 73 rotates, in this instance a quarter revolution, transferring the finished article half way to the carrier. The operation described is repeated, and the arm of the transfer mechanism carrying the finished article moved another quarter revolution, bringing the article over the carrier or conveyer but out of contact therewith. Upon the next descent of the former, the pair of arms alining in the direction of the mold carrier are shifted through the agency of the projection 78 and the pin or stud 82 upon the arm. During the movement of the arms in the direction of the mold carrier, the arm carrying the finished article is depressed, by reason of the incline or cam thereon passing beneath its guide 80. Thus, the finished article is deposited upon the carrier, and the complementary arm properly engages the article disengaged from the mold. This operation is repeated continuously as long as the machine is in operation, a finished vessel being deposited upon the carrier upon every quarter revolution of the table 73.

In the modified construction of transfer means illustrated in Figs. 16 and 17, I have shown the preferable form of arm, this being of an adjustable construction whereby it may be adapted for transferring articles of different sizes. Provision is also made for depressing the arm carrying the finished article before any other movement is imparted to it, so as to deposit the article upon the carrier or other suitable support and disengage itself entirely from the article before the projection of its complementary arm into engagement with the article to be transferred.

In the figures referred to, pivoted jaws 102 are carried at each end of the arm, a slide 103 travels within a longitudinal slot in the arm and carries a projecting stud 104, corresponding to the stud 82 previously described, that moves within a slot 105.

106 represent links connecting the jaws with the slide.

107 are guides upon the table 73.

108 are cross bars arranged upon the table for travel beneath the guides, and 109 is a rod encircling the stationary member 75 and connecting the bars 108, this rod being provided at each end with an upright projection 110. Each arm is provided with an incline 110ª, over which the bar 108 is adapted to travel for the purpose of depressing the arm. The stationary guide 76 is provided in this instance with a pivoted bell-crank lever 111, carrying at its upper end an inclined projection 112, and at its lower end a pivoted pawl 113. The alining arms are jointed in the same manner as those previously described, and are adapted to be reciprocated by the same mechanism.

The transfer means, as illustrated in Fig. 17, shows a pair of arms in a position to deposit the finished article and to be moved into engagement with the vessel just disengaged from the mold. Upon the forward travel of the block 77, the rod 109 is shifted, causing—first—the bar 108 to ascend the incline 110ª, thus effecting the depression of the jaws supporting the finished article; secondly, the opening of the jaws as the stud 104 travels within the slot 105; and, finally, as the stud reaches the end of the slot, the shifting of the alining arms. During this shifting movement, the jaws upon the arm alining with the arm just described are positioned about the article to be transferred from the mold. The arm is raised from its depressed position, and immediately upon the ascent of the former and the consequent retraction of the block 77 the jaws are closed about the article or vessel that is to be carried away from the mold. This is effected by a projection 114 upon the bar 83, which, during the forward movement of the block, passes over the bell-crank 111, rocking the same inwardly, and upon the return movement of the block engages the bell-crank, which in turn—through its pivoted pawl 113—engages the stud 104, causing the latter to travel in its slot a distance sufficient to close the jaws.

With reference to the former or spinner that fashions the article, it is the present practice to form the same with several "flats" or grooves running in line with the central axis, which are designed to assist in releasing the mold from the finished article after the spinning or spreading of the material is accomplished. It is found in practice that this construction does not satisfactorily relase or force the finished vessel from the former. I have therefore provided means for accomplishing this result, consisting of a series of grooves or flats, as 115, which are placed spirally on the periphery of the former and extend in a direction opposite to the direction of rotary movement, so that they will act as a screw to automatically release or screw free from the formed vessel as the former ascends. Not only will these grooves or flats serve this purpose, but they also assist in the perfect spreading or spinning of the plastic material, so that the vessels conform almost perfectly to the shape of the molds or dies upon which they are being pressed.

The former I have also made in two sections, an upper member 116 and a lower member 117, the parts being splined one to the other, so that relative longitudinal movement will be permitted, but independent rotary movement prevented. The sections are so proportioned that the division line 118 will be at a considerable distance above the bottom of the former, preferably half way between the lower face and the lower edge of the collar 119. As a result of this construction, when the former comes in contact with the soft or plastic material the parts of the former will be clamped together and the joint closed before there is any possibility of the material traveling upwardly, so as to be forced therein. A bolt 120 connects the former parts and limits the relative longitudinal movement, and a spring 121 is preferably—though not necessarily—employed for the purpose of spreading or separating the parts after the spinning has been effected.

In operation, the lower end of the former is pressed against the material, and the joint is closed and remains so until the former begins to ascend. At this moment the lower portion of the former drops by its own weight, or by the assistance of the spring if employed, thereby assisting the spiral grooves in releasing the vessel by drawing it away from the large end of the former, and by admitting air into the grooves, thus preventing any tendency of the material to cling to the former.

In the construction of mold I have formed the upper edge thereof with a removable ring 122 of hard material having its upper edge 123 a cutting edge. The collar 119 upon the former has its lower edge concaved to form the rounded top edge of the vessel, and is adapted to pass within the ring 122, the outer edge 124 of the former ring having a cutting or shearing engagement with the edge 123 of the mold. As the parts described coöperate, the article or vessel being formed is provided with a smooth finished edge that requires no trimming, which is especially desirable in tableware, such as cups, saucers, and the like.

In the machine described, the mold and former are shaped to produce flower pots, the centers of which have to be perforated for drainage. I therefore employ a hardened punch 125, on the spinner, which pierces through the material, forcing it through an opening 126 in the bottom plate of the mold which is provided for that purpose. Preferably, inclined openings 127 are employed leading from the main opening 126, which are adapted to carry the material clear of the ejecting rod, forming part of the operating mechanism for the bottom plate; also, vertical openings, as 128, are provided in the bottom plate for allowing the surplus material to escape during the pressing of the material in the mold.

In the practical operation of the machine, I have found that a sudden ejection of the article just formed is detrimental in that it has a tendency to collapse the vessel. I have therefore provided means in the machine described for effecting a slight gradual ejection or releasement of the article within the mold before it is finally delivered therefrom in condition to be carried away by the transfer mechanism.

The means preferably employed consist of an incline or cam 130 arranged beneath the series of molds in a position to be traveled over by the base plate rods or stems 71, the pitch of the incline being very slight so as to merely free the sides of the vessel from contact with the mold. The parts are so proportioned that this separation continues gradually until the mold sets temporarily in a position for the ejectment of the article, at which time the base plate rod or stem passes out of contact with the cam.

To obtain the best results in the commercial manufacture of plastic articles, I find it expedient to purify the plastic material by removing therefrom any and all foreign matter. To accomplish this, a screen of proper mesh 131 is preferably applied to the discharge end of the hopper, as shown in Fig. 19. Through this screen the material from the hopper is forced by the stirring and feeding mechanism therein, and all foreign matter is retained.

What I claim as my invention is,—

1. In an automatic machine for shaping plastic material, the combination with a series of molds, means for intermittently feeding said series of molds, a rotary former adapted to coöperate successively with each of said molds, feeding means for charging each of said molds successively with plastic material, delivery mechanism for delivering the completed article from each of said molds successively, said former, feeding means, and delivery mechanism acting simultaneously on different molds during the rest periods of the series of molds.

2. In an automatic machine for shaping plastic material, the combination with a mold carrier provided with a series of molds, a rotary former positioned above said mold carrier, means for shifting said mold carrier intermittently to successively bring the molds thereof into operative relation to said rotary former, means for locking the mold carrier against movement during its periods of rest, means for reciprocating the rotary former to cause it to enter one of the molds during the rest period of the mold carrier, means for simultaneously ejecting the finished article from another of the molds of the carrier, a transfer device, means operatively associated with the former operating mechanism for positioning the transfer device to cause the same to engage an ejected article during the rest period of the mold carrier, and means for shifting the transfer mechanism when the mold carrier is moved.

3. In an automatic machine for shaping plastic material, the combination with a mold carrier provided with a series of molds, a rotary former positioned above said mold carrier, means for shifting said mold carrier intermittently to successively bring the molds thereof into operative relation to said rotary former, means for locking the mold carrier against movement during its periods of rest, means for reciprocating the rotary former to cause it to enter one of the molds during the rest period of the mold carrier, means for simultaneously elevating a finished article from another of the molds of the carrier, a transfer mechanism means operable during the rest period of said mold carrier for operating the transfer mechanism to cause it to engage the article so elevated, and means operable upon the movement of the mold carrier for shifting the transfer mechanism with the article so engaged.

4. In an automatic machine for shaping plastic material, a frame, a mold carrier rotatably mounted for movement in a horizontal plane in said frame and provided with a series of molds, a rotary former mounted for reciprocation in said frame above said rotary mold carrier, a power shaft journaled in said frame, gearing between said power shaft and said former for continuously rotating the former, gearing between said power shaft and said mold carrier for intermittently rotating the mold carrier to successively bring the molds thereof under said former, means actuated by the power shaft for locking the mold carrier against rotation, during its periods of rest, and gearing between the power shaft and the former for reciprocating the former during the periods of rest of the mold carrier to cause the same to enter one of the molds of said carrier.

5. In an automatic machine for shaping plastic material, a frame, a mold carrier rotatably mounted in said frame and provided with a series of molds, a rotary former mounted for reciprocation in said frame above said mold carrier, a power shaft journaled in said frame, gearing between said power shaft and said former for rotating the same, gearing between the power shaft and the mold carrier, a clutch in said last mentioned gearing, a lock for holding the mold carrier against rotation in said frame, cams for simultaneously actuating said clutch and lock, gearing for continuously driving said cam from the power shaft, and gearing between the power shaft and the rotary former for reciprocating the former during the periods of rest of the mold carrier.

6. In an automatic machine for shaping plastic material, the combination with a rotary former, of mechanism for reciprocating the same including a driving member, and yielding means interposed between said member and the former, and an adjustable stop for limiting the downward movement of said former.

7. In an automatic machine for shaping plastic material, the combination with a rotary former, of a disk crank and operating means therefor, a cross head operated by the crank for reciprocating the former, and a spring interposed between the head and former compressible upon the engagement of the latter with a mold.

8. In an automatic machine for shaping plastic material, a frame, a head mounted to reciprocate vertically in said frame, a vertically disposed shaft rotatably mounted in said head, a former carried by the lower end of said shaft, a cross head yieldably connected to said head, and a crank rotatably mounted in said frame and operatively connected to said cross head.

9. In an automatic machine for shaping plastic material, the combination with a standard, of a rotary mold carrier thereon, a plurality of molds upon the carrier traveling intermittently in a horizontal plane, a vertically reciprocating rotary former adapted to successively engage the molds, an ejector positioned beneath the mold series beside the former, a vertically movable member within the standard having an operative connection with the ejector, and a member reciprocating with the former and adapted to directly engage said first-mentioned member to actuate said ejector.

10. In an automatic machine for shaping plastic material, a mold carrier provided with a series of molds, means for successively charging the molds with plastic material, mechanism for working the material in the molds, means for freeing the finished articles from the molds, transfer mechanism for the finished articles comprising a support at one side of the mold carrier, an arm mounted to reciprocate longitudinally on said support and fashioned to engage one of the finished articles, means for shifting said arm longitudinally to cause it to engage one of the finished articles, and means for rotating said arm to remove said finished article.

11. In an automatic machine for shaping plastic material, a mold carrier provided with a series of molds, means for successively charging the molds with plastic material, mechanism for working the material in the molds, means for freeing the finished articles from the molds, transfer mechanism for the finished articles comprising a support at one side of the mold carrier, a plurality of arms carried by said support and positioned in a horizontal plane, said arms being fashioned to engage with the finished articles, means for reciprocating said arms longitudinally, and means for rotating said arms intermittently in a horizontal plane.

12. In an automatic machine for shaping plastic material, the combination with a series of traveling molds, of means for charging the same with plastic material, a rotary former engageable with the molds successively, means for freeing the finished articles from the molds, and a plurality of longitudinally reciprocating and intermittently rotating transfer members adapted to successively embrace and deliver the formed articles.

13. In an automatic machine for shaping plastic material, the combination with a series of traveling molds, of means for charging the same with plastic material, a rotary former engageable with the molds successively, means for freeing the finished articles from the molds, and a delivery mechanism for the formed articles comprising a pair of oppositely disposed article-embracing arms reciprocating periodically, means for periodically reciprocating said arms longitudinally to engage and disengage with the articles and means for rotating said arms intermittently.

14. In an automatic machine for shaping plastic material, the combination with a series of traveling molds, of means for charging the same with plastic material, a rotary former engageable with the molds successively, means for freeing the finished articles from the molds, and a delivery mechanism for the finished articles comprising a plurality of intermittently traveling arms, means for shifting said arms longitudinally to successively bring the same into engagement with the finished articles and mechanism for freeing the arms from the articles after the delivery has been effected.

15. In an automatic machine for shaping plastic material, the combination with an intermittently traveling series of molds, means for charging the molds with plastic material, a rotary former engageable with the molds successively, means operable upon the movement of the molds for initially releasing each formed article from its respective mold, and mechanism for subsequently separating the articles from the molds.

16. In an automatic machine for shaping plastic material, the combination with an intermittently series of traveling molds provided each with a movable base plate, of automatic means operable during the movement of the molds for initially raising the plates to gradually release the articles within the molds, and means for subsequently projecting the plates to permit of the removal of the articles.

17. In an automatic machine for shaping plastic material, the combination with an intermittently traveling series of molds provided each with a movable base plate, of a projection on each plate, an incline beneath the molds, in the path of the projections, and an ejector acting successively upon the base plates to free the articles.

18. In an automatic machine for shaping plastic material, the combination with an intermittently traveling series of molds, of means for supplying plastic material thereto, a rotary former successively engaging the molds to form the articles, and a delivery mechanism comprising a longitudinally shiftable transfer device provided with complementary movable jaws, and means for periodically shifting said device and operating the jaws to respectively embrace and disengage from the articles.

19. In an automatic machine for shaping plastic material, the delivery mechanism comprising an intermittently rotating transfer member provided with a longitudinally movable member having oppositely disposed movable jaws, a connection therebetween acting on operation to respectively open and close the same, and means for periodically shifting the member and operating the connection.

20. In an automatic machine for shaping plastic material, the delivery mechanism comprising an intermittently rotating transfer member provided with a longitudinally movable member having oppositely disposed movable jaws, a connection therebetween acting on operation to respectively open and close the same, and means for periodically shifting the member and for operating the jaws prior to each actuation of the transfer member.

21. In an automatic machine for shaping plastic material, a frame, a rotary mold carrier mounted in said frame and provided with a series of circumferentially arranged molds, a rotary former mounted to reciprocate in said frame and adapted to successively coöperate with the molds of said mold carrier, means for reciprocating said former during the periods of rest of said mold carrier, means for freeing the completed articles from the molds, and transfer mechanism for the completed articles comprising a support positioned at one side of the mold carrier, a table rotatably mounted on said support, gearing between said table and said mold carrier, an arm carried by said table, and means for shifting said arm when the table is at rest to cause the same to engage one of the completed articles which has been freed from its mold.

22. In an automatic machine for shaping plastic material, a frame, a rotary mold carrier mounted in said frame and provided with a circumferentially disposed series of molds, a former mounted to reciprocate in said frame, means for intermittently rotating the mold carrier, means for reciprocating the former during the periods of rest of the mold carrier, means for freeing the completed articles from the molds, and transfer mechanism for the completed articles, comprising a support at one side of the mold carrier, a table rotatably mounted on said support and geared to rotate with the mold carrier, a transfer arm movably supported on said table, and means actuated by the reciprocation of the former for shifting said arm on said table to a position to engage one of the completed articles which has been freed from its mold.

23. In an automatic machine for shaping plastic material, a frame, a mold carrier rotatably supported in said frame and provided with a circularly arranged series of molds, a former mounted to reciprocate in said frame, means for intermittently rotating the mold carrier, means for reciprocating the former during the periods of rest of the mold carrier, means for freeing the completed articles from the molds, a carrier, and transfer mechanism comprising a support positioned between said carrier and said mold carrier, a table rotatably mounted on said support and geared to rotate with said mold carrier, a longitudinally movable bar mounted on said table and provided at its ends with portions fashioned to engage and support one of the completed articles, means for shifting said bar longitudinally while the table is at rest, and means for lowering one end of said bar as the same is shifted.

24. In an automatic machine for shaping plastic material, a frame, a mold carrier rotatably supported in said frame, and provided with a circular series of molds, a reciprocating former mounted in said frame, means for shifting said mold carrier intermittently, means for reciprocating said former in the periods of rest of said mold carrier, means for freeing the completed articles from the molds, a delivery carrier at one side of the mold carrier, and transfer mechanism comprising a support positioned between said delivery carrier and said mold carrier, a table rotatably mounted on said support and geared to said mold carrier, a longitudinally movable transfer member mounted on said table and provided with oppositely disposed movable jaws, and means for shifting said longitudinally movable transfer member and operating the jaws to respectively engage and disengage from the articles.

25. In an automatic plastic working machine, the combination with a series of molds, of a reciprocating former, means for shifting the molds to bring the same successively into operative relation to the former, a lubricant holder provided with a discharge nozzle overlying one of said molds, and means actuated automatically by the reciprocation of the former for causing a predetermined amount of lubricant to flow through said nozzle to the mold therebeneath.

26. In an automatic plastic working machine, the combination with a series of molds, of a reciprocating former, means for shifting the molds to bring the same successively into operative relation to the former, a lubricant holder provided with an outlet overlying the molds and positioned so that the molds will pass thereunder as they are moved into operative relation to the former, a valve in said outlet, and a trip movable with the former and adapted upon the actuation of the former to shift said valve to permit lubricant to pass through the outlet to the mold therebeneath.

In testimony whereof I affix my signature in presence of two witnesses.

WILLIAM J. BAIRD.

Witnesses:
JAMES P. BARRY,
W. K. FORD.